United States Patent [19]

McKeever

[11] 3,961,703
[45] June 8, 1976

[54] CONVEYOR SYSTEM FOR LENGTHS OF FLEXIBLE MATERIAL

[75] Inventor: Carl McKeever, Kendallville, Ind.

[73] Assignee: Lyall Electric, Inc., Albion, Ind.

[22] Filed: July 31, 1974

[21] Appl. No.: 493,274

[52] U.S. Cl. .............................. 140/105; 29/200 A; 198/179
[51] Int. Cl.² .......................................... B21F 23/00
[58] Field of Search .......... 29/200 A, 203 R, 203 D, 29/628; 81/9.51; 226/173; 140/139, 140, 147, 105; 198/179

[56] References Cited
UNITED STATES PATENTS

| | | | |
|---|---|---|---|
| 3,621,984 | 11/1971 | Grassauer | 198/179 |
| 3,653,412 | 4/1972 | Gudmestad | 81/9.51 |
| 3,686,752 | 8/1972 | Hammond | 29/628 |
| 3,703,954 | 11/1972 | Gudmestad | 198/179 |

FOREIGN PATENTS OR APPLICATIONS 1,136,545  12/1968  United Kingdom ................ 198/179

Primary Examiner—Robert J. Spar
Assistant Examiner—James M. Slattery

[57] ABSTRACT

A conveyor system for use in processing lengths of flexible material in which the conveyor system is formed of a pair of parallel spaced chains adapted to be displaced longitudinally and carrying a plurality of gripping devices positioned to successively receive lengths of flexible material from a source thereof. The lengths of flexible material are conveyed in an intermittent fashion to permit various work operations to be performed on the successive lengths of flexible material. The gripping devices include a body member fixed to the conveyor having a notch therein adapted to receive a cross section of the lengths of flexible material, and a lever pivotally mounted on the body member and having a arcuate surface adapted to secure the lengths of flexible material in the notch of the body member. The conveyor system also includes discharge equipment including an elongate bar extending longitudinally between the gripping devices at one end of the conveyor system, and including means to release the lengths of flexible material from the gripping devices as the gripping devices advance the lengths of flexible material over the bar whereby the lengths of flexible material are bent over the bar for discharge from the bar.

13 Claims, 12 Drawing Figures

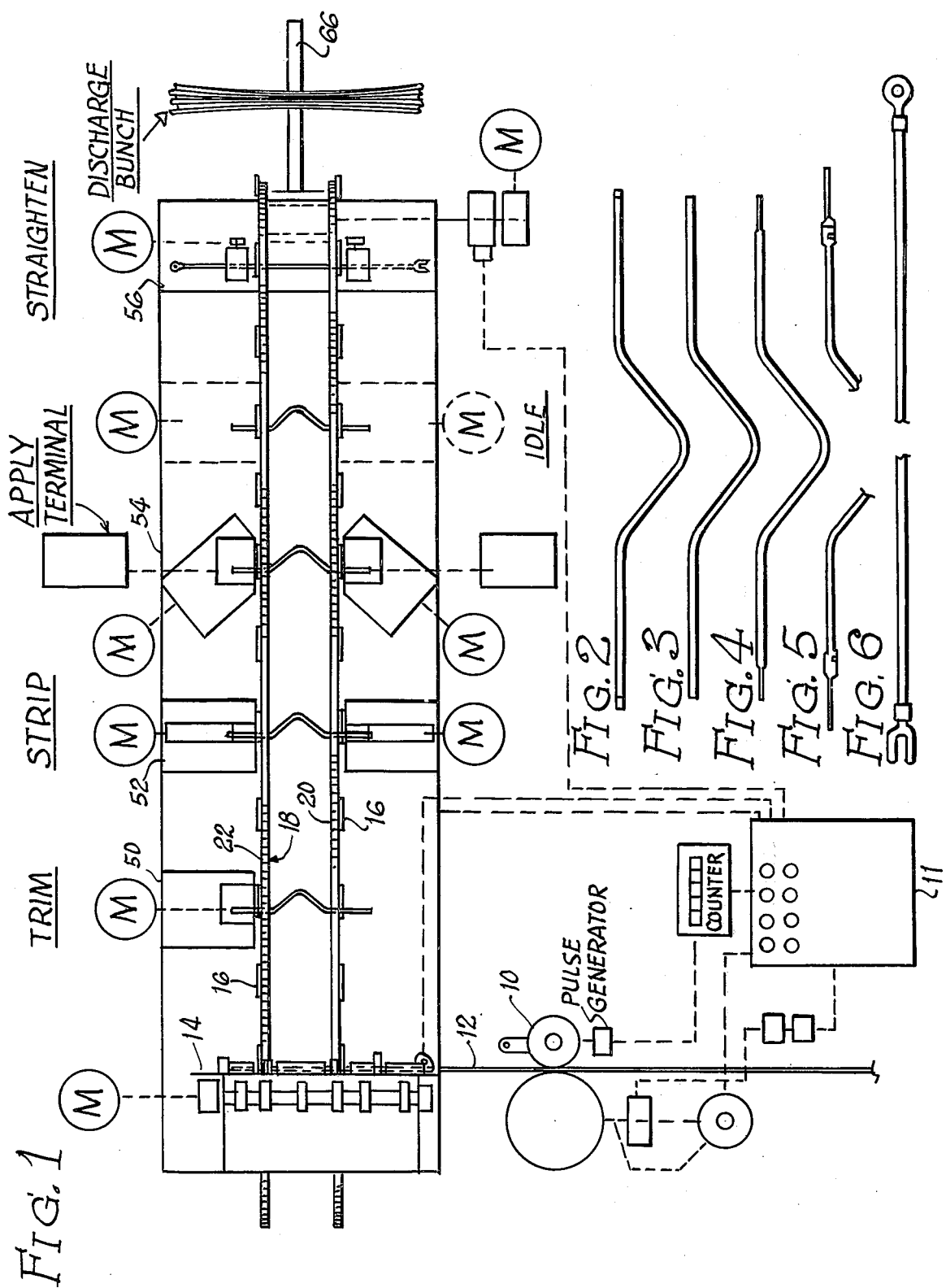

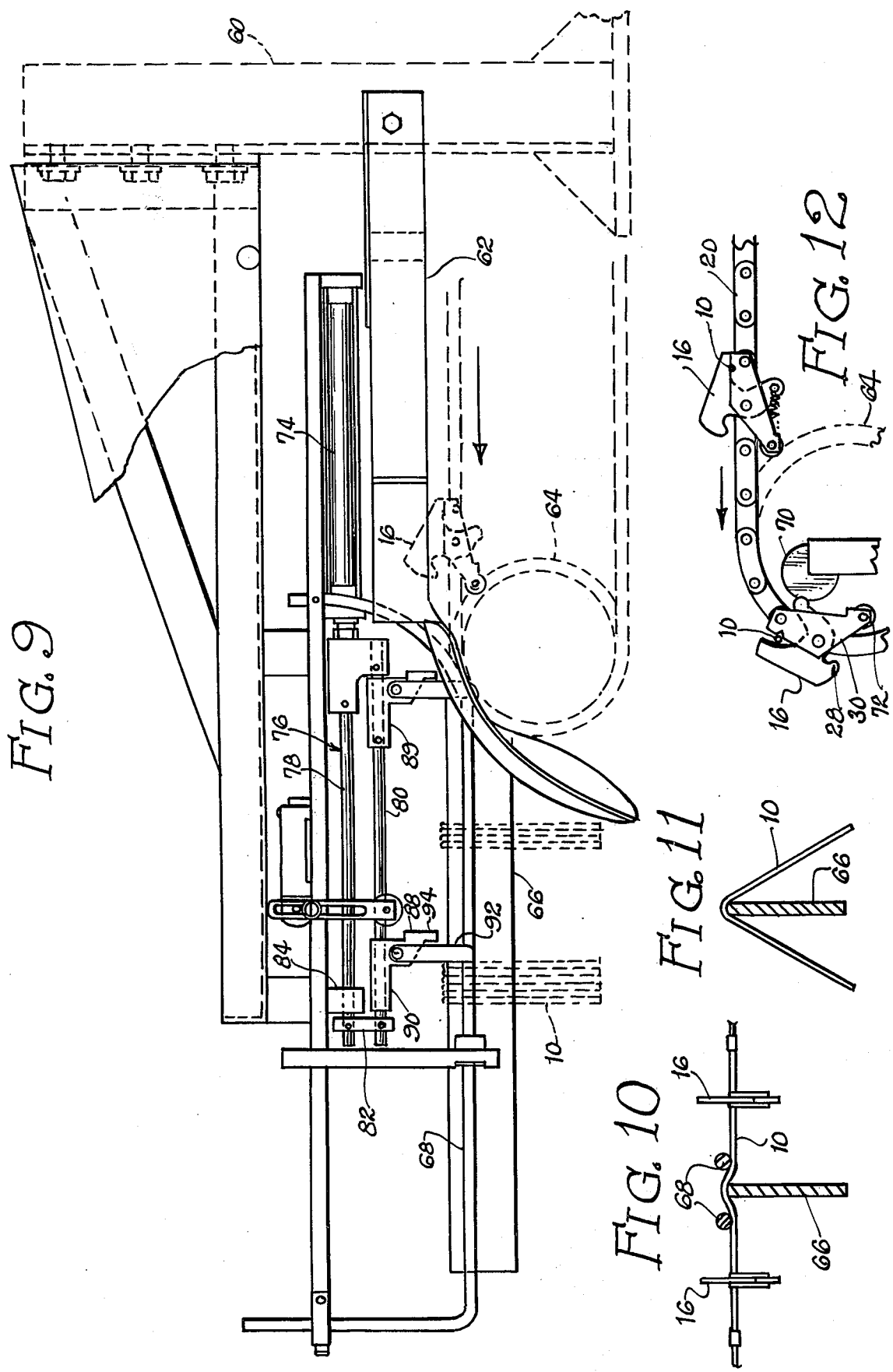

CONVEYOR SYSTEM FOR LENGTHS OF FLEXIBLE MATERIAL

The present invention relates to apparatus for handling lengths of flexible material, such as insulated electrical wire, and more particularly, to apparatus for conveying lengths of flexible material for processing by a plurality of work stations, and discharge from the apparatus.

In copending application Ser. No. 493,273 filed concurrently herewith and entitled "METHOD AND APPARATUS FOR MAKING LENGTHS OF FLEXIBLE MATERIAL", there is described a method and apparatus for processing elongated lengths of flexible material such as insulated wire in which wire is drawn off from a reel thereof and fed intermittently into the apparatus in which it is cut off into lengths and gripped with the ends of the cut-off lengths a fixed distance apart. When the wire is cut off and gripped, it is moved along the apparatus in indexed steps to permit work operations to be performed on at least one end of the wire. The work operations may consist of stripping the insulation from at least one end of the wire and apply a terminal thereto. When the leads have been completely processed, the apparatus straightens the leads and delivers them to a receiving station where they are counted and discharged from the apparatus in batches of a predetermined number. These batches can be tied together for storage or treatment.

It is a primary object of the present invention to provide apparatus for handling such lengths of flexible material in combination with apparatus of the type described in the above application.

It is a more specific object of the invention to provide a conveyor apparatus for handling lengths of flexible material, such as insulated wire, and apparatus for discharging the lengths of flexible material in an oriented position and in bunches of a predetermined number.

It is a further object of the invention to provide a conveyor for transporting lengths of flexible material in the apparatus described in the foregoing application which is capable of operating at high speeds and in a reliable manner.

These and other objects and advantages of the invention will appear more fully hereinafter and for purposes of illustration, but not of limitation, an embodiment of the present invention is shown in the accompanying drawings, in which:

FIG. 1 is a schematic plan view of an apparatus embodying the features of the invention illustrating the relationship of the handling apparatus of this invention with respect to the work stations;

FIGS. 2 to 6 are views illustrating the electrical wire being processed in accordance with the present invention at various stages;

FIG. 9 is a plan view of an elevation illustrating the discharge assembly of the present invention;

FIG. 10 is a schematic view illustrating the processing of wire in the discharge apparatus illustrated in FIG. 9;

FIG. 11 is a view illustrating the form of the flexible material as it is ready for discharge from the apparatus; and FIG. 12 is a detailed view of a portion of the apparatus shown in FIG. 9.

Figure 7:
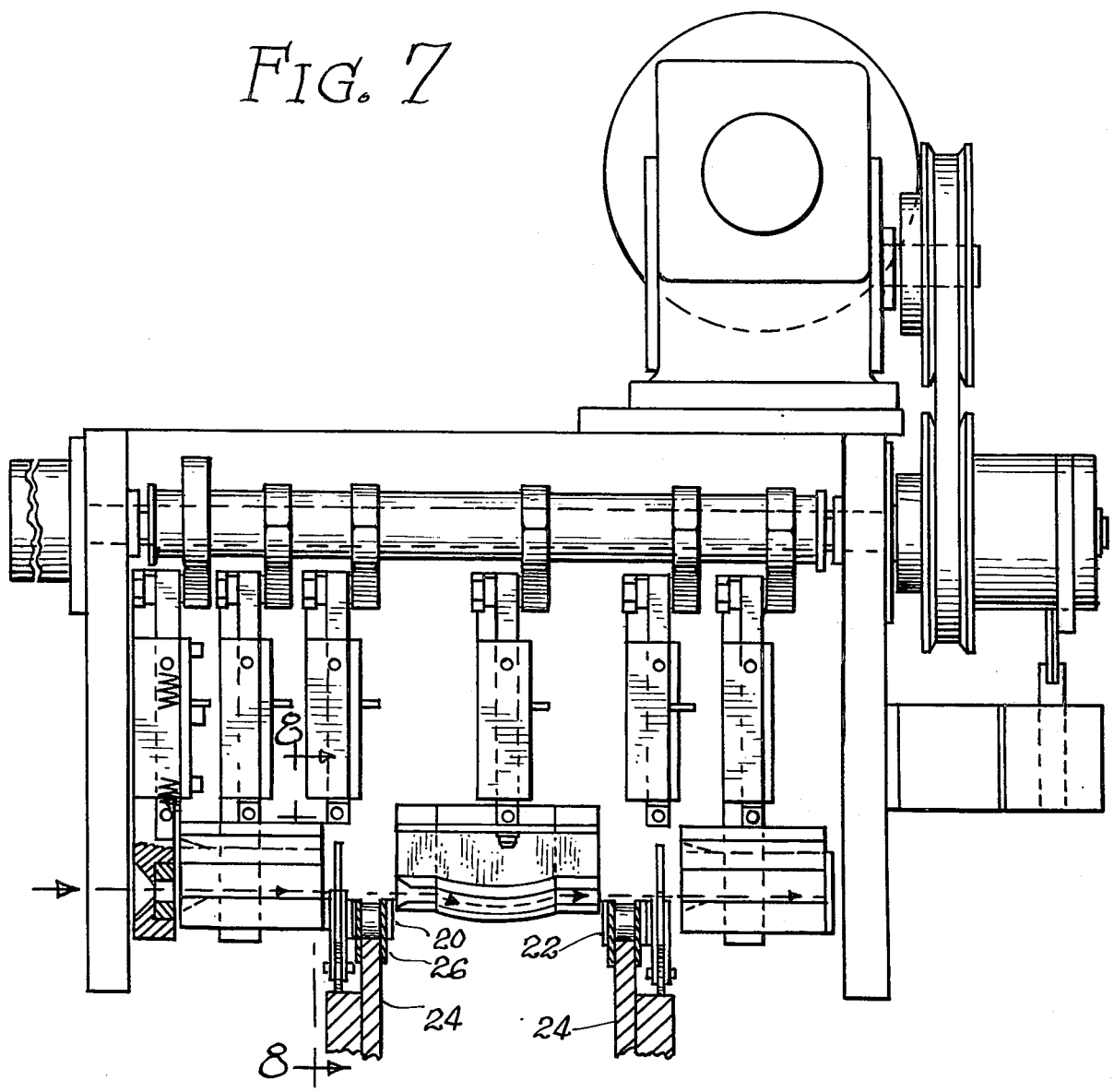
FIG. 7 is a view in elevation of the cam head assembly and its relation to the conveyor system of the present invention.

The concepts of the present invention reside in apparatus for handling lengths of flexible material, such as wire and the like, which can be used in combination with the apparatus described in the foregoing copending application. As is described in the foregoing copending application, there is provided a cam head assembly and means for feeding a continuous length of flexible material thereto. In the cam head assembly, as is more fully described in the foregoing copending application the disclosure of which is incorporated herein by reference, the continuous length of material supplied to the cam head assembly is cut into predetermined lengths.

In accordance with the concepts of the present invention, there is provided an elongate conveyor formed of a pair of spaced parallel conveying means adapted to be displaced longitudinally with the conveying means having mounted thereon a plurality of gripping means positioned to successively receive lengths of flexible material from the cam head assembly. Lengths of flexible material cut to the desired lengths in the cam head assembly are thus supplied to the conveying means and are advanced by the conveying means over the length of the apparatus in an intermittent fashion to permit various work operations to be performed on the length of flexible material. After the various work operations have been performed on the predetermined lengths of flexible material which are advanced along the apparatus with the conveying means, the predetermined lengths of flexible material are straightened and then discharged from the conveyor.

In accordance with another concept of the present invention, the discharge means of the present invention operates to form the lengths of flexible material into the desired configuration and remove the lengths of flexible material from the gripping means of the conveyor for discharge in bunches which are ready for storage or shipping.

Having described the basic concepts of the present invention, reference is now made to the accompanying drawings for a detailed description of the invention. As is shown in FIG. 1, the apparatus includes feed means which are generally referred to as 10 in the drawing which serve to supply a continuous length of flexible material 12 to a cam head assembly generally referred to as 14 in the drawing. The details as to the feed means 10 and the cam head assembly are more fully described in the foregoing copending application.

The flexible material 12 advances to the cam head assembly 14, is cut to the desired length and is then gripped by means of a plurality of gripping means 16 which are mounted on an endless conveyor 18.

As is perhaps most clearly shown in FIG. 7 of the drawing, the endless conveyor is formed by a pair of spaced conveyor chains 20 and 22 which extend over the length of the apparatus. Each of the chains 20 and 22 is mounted on a pair of parallel spaced rails 24 which serve to support and guide the endless chains 20 and 22, respectively, over the length of the apparatus.

Figure 8:
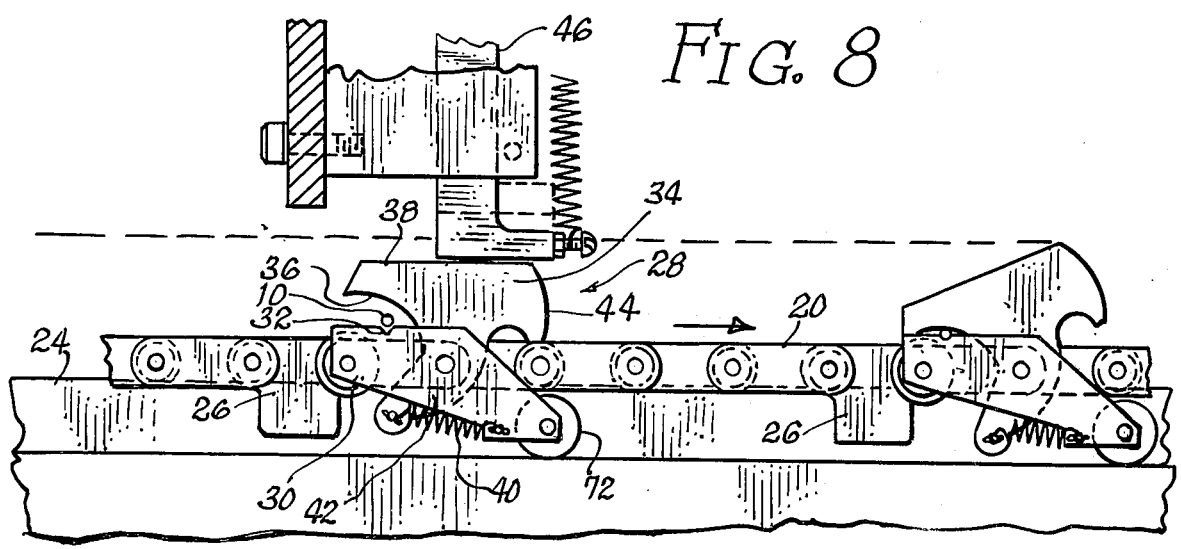
FIG. 8 is a sectional view taken along the lines 8—8 of FIG. 7.

The details as to the endless chains 20 and 22 are most clearly illustrated in FIG. 8 of the drawing. As can be seen from this figure, the chain is formed of a plurality of lengths having a plurality of pairs of support tabs 26 which engage opposite sides of the rail 24.

As is shown in FIG. 8 of the drawing, the chains 20 and 22 are also provided with a plurality of gripping means fixed thereon adapted to grip lengths of flexible material so that the length of flexible material can be conveyed with the conveyor system. The gripping means are illustrated in FIG. 8 generally as 28 and includes a body portion 30 mounted on the chain 20. As is shown in this Figure, the body portion includes a notch 32 adapted to receive the cross-section of the length of flexible material to retain the length of flexible material in a gripping relationship. The gripping means 28 also includes a gripping lever generally designated as 34 in FIG. 8, having a generally anvil configuration and being pivotally mounted on the body member 30. The gripping lever includes an arcuate surface 36 toward its rear portion adapted to engage the cross-section of the length of flexible material when the latter is positioned in the notch 32 of the body portion 30. The lever member also includes an upper surface 38 which, when the lever member 34 is in gripping relation with a length of flexible material positioned in the notch 32 is inclined in rearward direction. As is also shown in FIG. 8 of the drawing, the lever member 34 is constantly urged toward a gripping position with a length of flexible material positioned in a notch 32 by means of a spring 40. In this way, a downward force exerted on the upper surface 38 operates to pivot the lever member 34 in a forward direction away from engagement with the cross-section of a length of flexible material positioned in the notch 32 to thereby release the length of flexible material from the gripping means 28. For this purpose, the gripping means 34 is formed with an anvil shaped body and a stem portion 42 which has a generally arcuate configuration extending in a forward direction, i.e. a direction in which the conveyor is advanced. In the preferred practice of the invention, the anvil portion of the gripping lever 34 is preferably formed with an arcuate leading surface 44.

Thus, in operation, a length of flexible material which has been cut to the predetermined lengths is engaged by the gripping members 28 as it is discharged from the cam head assembly 14. As is more fully described in the foregoing copending application, when the cam head assembly is prepared to discharge the length of flexible material, means in the cam head assembly depress a push rod 46 which is positioned above the upper surface 38 to pivot the gripping lever 34 and thereby open the gripping means 28 to receive the length of flexible material in the notch 32. The push rod 46 is then raised to permit the gripping lever 34 to be pivoted toward a gripping relation with the cross-section of the length of flexible material 12 positioned in the groove 32.

After the length of flexible material has been engaged in a gripping relationship with the gripping means 16, the chains 20 and 22 having the gripping means mounted thereon are advanced over the rails 24 by an indexing drive (not illustrated in the drawing) such that the conveyor chains 20 and 22 move in a stepwise or incremental fashion. The indexing of the conveyor is controlled by means of control means 11 to insure that the chains 20 and 22 are in registry with the plurality of work stations. These work stations may include a trim station 50, if desired, although in the preferred embodiment of the present invention the trim station is not employed, a stripping station 52, a terminal application station 54 and a straightening station 56, all of which are described in the foregoing copending application. At these various stations, the flexible material, such as an insulated wire, can be trimmed, stripped, have a terminal affixed thereto and straightened, as illustrated in FIGS. 2-6 inclusive.

At the discharge end of the machine there is provided the discharge apparatus of the present invention which is shown in greater detail in FIG. 9 of the drawing. The discharge station includes frame members 60 and 62 as well as a pair of sprocket wheels 64 which operate to support one end of the endless chains 20 and 22. Positioned between the sprocket wheels 64 is an elongate accumulator bar 66 over which the length of flexible material is advanced by the gripping means 16 as the chains 20 and 22 approach the sprocket wheels 64. Positioned alongside, but spaced from the bar 66, are a pair of folding rods 68, with the folding rods 68 being positioned just below the top of the bar 66. In this way, as the length of material 12 in a gripping relationship with the gripping means 16 on the endless chains 20 and 22 is advanced over the bar 66, the folding rods 68 operate to bend the flexible material 12 thereunder as is illustrated in FIG. 10 of the drawing. As the endless chains 20 and 22 are advanced over the sprocket wheels 64, the body portion 30 of the gripping means 28 comes in contact with a cam member 70 positioned adjacent to the sprocket wheel 64, as shown in FIG. 12 of the drawing, to thereby open the gripping means 28 to permit the flexible lead 12 to be released therefrom. For this purpose, the leading edge of the body portion 30 of the gripping means 28 is provided with a roller 72 which is carried alongside the rails 24. As the roller 72 engages the cam member 70, the body portion 30 of the gripping means 28 is raised to permit the flexible material 10 to be disengaged from the notch 32 and the corresponding arcuate surface 36 of the gripping lever 34. Thus, the flexible material 12 having been released from the gripping means 28, is deformed over the bar 66 as shown in FIG. 11 of the drawing.

The discharge apparatus of the present invention also includes means to advance the length of flexible material which has been deformed over the bar 66 outwardly away from the apparatus. For this purpose there is provided a pneumatic or hydraulic reciprocating cylinder 74 mounted above the accelerator bar 66 which actuates a slidable shoe shown generally as 76 in FIG. 9. The slidable member 76 includes a pair of rods 78 and 80 which are fixed each to the other and also at their rearward end and their forward end by means of a connecting element 82 so that actuation of the cylinder 74 operates to displace push rods 78 and 80 to the left as shown in FIG. 9. To support the rods 78 and 80 in an advanced position upon actuation of the cylinder 74, there is provided support means 84 to guide and support the upper rod 78 and an adjustable support means 86 to support the lower rod means 80. Fixed to the lower rod 80 are a pair of finger elements 88 and 89 each of which includes a base 90 and a pivotal finger 92. The base includes a stop 94 to prevent the finger 92 from being pivoted past the stop 94. In this way, as the finger means are advanced to the left in FIG. 9 by the cylinder 74, the finger 92, when encountering the resistance afforded by the length of flexible material, abuts the stop 94 to advance the length of flexible material overlying the bar 66 to the left. Since each of the finger means 88 and 89 operate in the same manner, the finger means 89 operates to advance lengths of flexible material over a portion of the distance of the accumulator bar, from which the length of flexible material is further advanced by the finger member 88. As the finger members 88 and 89 are advanced to the right, as shown in FIG. 9, the pivotal fingers 92 are kicked up when they contact a length of flexible material to avoid displacing the length of flexible material toward the conveyor system rather than outwardly to the left for discharge as shown in FIG. 9.

In the operation of the apparatus of the present invention, lengths of flexible material which have been processed in the cam head assembly are advanced along the conveyor chains 20 and 22 while secured in the gripping means 16. The conveyor is indexed in incremental lengths along the apparatus to bring the gripping means 16 into registration with each station mounted downstream of the cam head assembly of the apparatus.

It is possible and sometimes desirable to employ a counter mechanism which is actuated by the leads 12 at the discharge end of the apparatus to determine the number of leads discharged. In this way, leads discharged from the apparatus can be collected in groups or batches of a predetermined number.

It will be understood that various changes and modifications can be made in the details of construction, operation and use of the apparatus of the invention without departing from the spirit of the invention, especially as defined in the following claims.

I claim:

1. Apparatus for handling lengths of flexible material comprising an elongate conveyor, said conveyor being defined by a pair of parallel, spaced chain means adapted to be displaced longitudinally, a plurality of gripping means mounted along the chain means, each of the gripping means including a body member fixed to the chain means, said body member having a notch thereon adapted to receive the cross section of the lengths of flexible material, lever means pivotally mounted on the body member, said lever means including an arcuate surface adapted to engage the cross section of the length of flexible material in the notch in the body member and an upper surface opposite the arcuate surface adapted to pivot the lever means relative to the body member, spring means constantly urging the lever member into engagement with the cross section of the length of flexible material whereby a downward force exerted on the upper surface operates to pivot the lever member away from engagement with the cross section of the length of flexible material in the notch against the action of the spring means to release the flexible material from the gripping means, and discharge means to unload lengths of flexible material from the conveyor, said discharge means including an elongate bar extending longitudinally between the pair of gripping means, a pair of elongate spaced parallel folding elements extending substantially parallel but spaced from said bar, means to release the lengths of flexible material from the gripping means as the gripping means advance the lengths of flexible material over the bar whereby the lengths of flexible material are advanced over the bar and are bent under the folding elements as the lengths of flexible material are released from the gripping means.

2. Apparatus as defined in claim 1 wherein the chain means includes a pair of parallel spaced rails, with said chain means being mounted on said rails for displacement thereof.

3. Apparatus as defined in claim 1 wherein the discharge means includes means to advance the lengths of flexible material along the bar for discharge therefrom.

4. Apparatus for handling lengths of flexible material comprising means to intermittently supply predetermined lengths of a flexible material, an elongate conveyor defined by a pair of parallel space chain means adapted to be displaced intermittently in a longitudinal direction, a plurality of gripping means mounted along the chain means and positioned to successively receive lengths of the flexible material from the means to supply the lengths of flexible material, each of the gripping means including a body member fixed to the chain means, said body member having a notch thereon adapted to receive the cross section of the length of flexible material, lever means pivotally mounted on the body member, said lever means including an arcuate surface adapted to engage the cross section of the length of flexible material in the notch in the body member and an upper surface opposite the arcuate surface adapted to pivot the lever means relative to the body member, spring means constantly urging the lever member into engagement with the cross section of the length of flexible material whereby a downward force exerted on the upper surface operates to pivot the lever member away from engagement with the cross section of the length of flexible material in the notch against the action of the spring means to release the flexible material from the gripping means, and means to discharge the flexible material, said discharge means including an elongate bar extending longitudinally between the pair of gripping means, a pair of elongate spaced parallel folding elements extending substantially parallel but spaced from said bar, means to release the lengths of flexible material from the gripping means as the gripping means advance the lengths of flexible material over the bar whereby the lengths of flexible material are advanced over the bar and are bent under the folding elements as the lengths of flexible material are released from the gripping means.

5. Apparatus as defined in claim 4 wherein the chain means includes a pair of parallel spaced rail, with said chain means being mounted on said rails for displacement thereof.

6. Apparatus as defined in claim 4 wherein the discharge means includes means to advance the lengths of flexible material along the bar for discharge therefrom.

7. Apparatus for discharging lengths of flexible material from a conveyor system in which the lengths of flexible material are gripped by a pair of spaced gripping means comprising an elongate bar extending longitudinally between the pair of gripping means, a pair of elongate spaced parallel folding elements extending substantially parallel but spaced from said bar, means to release the lengths of flexible material from the gripping means as the gripping means advance the lengths of flexible material over the bar whereby the lengths of flexible material are advanced over the bar and are bent under the folding elements as the lengths of flexible material are released from the gripping means, and means to advance the lengths of flexible material along the bar for discharge therefrom.

8. Apparatus as defined in claim 7 wherein the means to advance the lengths of flexible material along the bar includes at least one finger means slidably mounted above said bar and adapted to displace lengths of flexible material bent over said bar longitudinally, and means to reciprocate the finger means to advance the finger means along said bar.

9. Apparatus as defined in claim 8 wherein the means to advance the finger means along said bar includes fluid actuated means.

10. Apparatus as defined in claim 8 wherein said finger means includes a base mounted for reciprocation along said bar, a pivotal finger mounted on said base and stop means urging the finger toward engagement with the lengths of flexible material as the finger means is reciprocated to discharge lengths of flexible material along said bar.

11. Apparatus for handling lengths of flexible material comprising an elongate conveyor, said conveyor being defined by a pair of parallel, spaced chain means adapted to be displaced longitudinally, a plurality of gripping means mounted along the chain means to receive the cross section of lengths of flexible material, said gripping means releasably engaging the cross section of the flexible material, and discharge means to unload lengths of flexible material from the conveyor, said discharge means including an elongate bar extending longitudinally between the pair of gripping means, a pair of elongate spaced parallel folding elements extending substantially parallel but spaced from said bar, means to release the lengths of flexible material from the gripping means as the gripping means advance the lengths of flexible material over the bar whereby the lengths of flexible material are advanced over the bar and are bent under the folding elements as the lengths of flexible material are released from the gripping means.

12. Apparatus as defined in claim 11 wherein the discharge means includes means to advance the lengths of flexible material along the bar for discharge therefrom.

13. Apparatus as defined in claim 11 wherein the chain means includes a pair of parallel, spaced rails, with said chain means being mounted on said rails for displacement thereof.

* * * * *